July 15, 1958     H. W. LONG, JR     2,843,450
METHOD OF RECOVERING URANIUM MINERAL VALUES
Filed Jan. 18, 1955
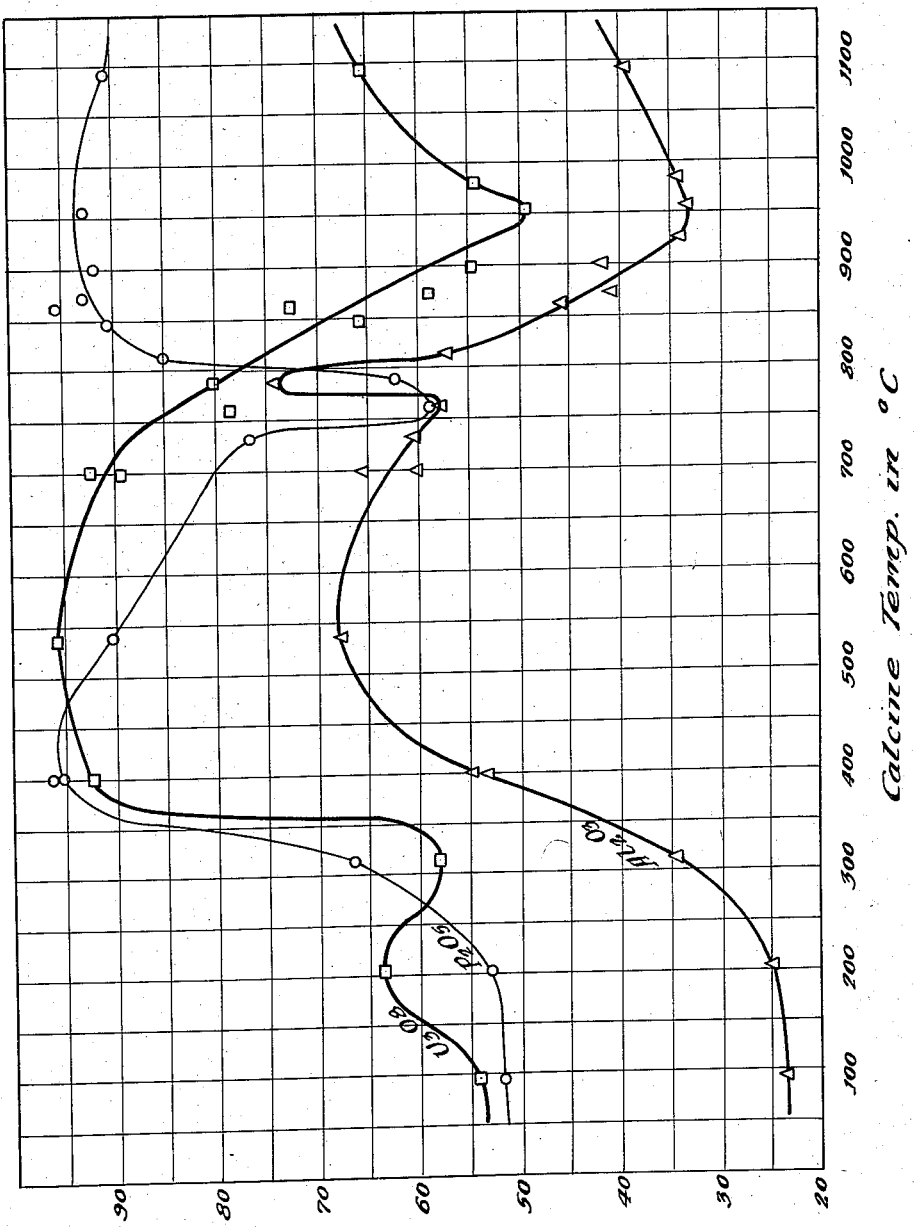
Inventor:
Harold W. Long, Jr.
By Ernest V. Haines
Attorney under# United States Patent Office 2,843,450
Patented July 15, 1958

2,843,450

METHOD OF RECOVERING URANIUM MINERAL VALUES

Harold W. Long, Jr., Bartow, Fla., assignor, by mesne assignments, to the United States of America as represented by the United States Atomic Energy Commission Application January 18, 1955, Serial No. 482,449

5 Claims. (Cl. 23—14.5)

This invention relates to the recovery of mineral values contained in leached zone material found as part of the overburden covering Florida pebble phosphate matrix, mainly found in Polk County, Florida. The leached zone material is found in a stratified layer above the mineable phosphate matrix and below the pleistocene sand overburden. More particularly, the invention relates to the recovery of phosphorus, aluminum and uranium values from this leached zone material.

Mineralogical studies indicate that the so-called leached zone material is chemically identified as a mixture of hydrated aluminum phosphate, calcium aluminum phosphate and fine quartz clay with some unleached and partially leached calcium phosphate pebble, the latter being found particularly in a type of intermediate zone stratified between the true leached zone and the phosphate matrix. Examinations of the leached zone material indicate that there are major mineral phases of quartz, wavellite, and perhaps pseudo wavellite with some phases of feldspar, fluorapatite, kaolinite and heavy minerals such as zircon and rutile. The present invention is directed to the treatment of this leached zone material or ore fractions in which the clay like portions of the leached zone material predominate.

The following analyses of leached zone material was obtained by averaging the analyses obtained from about 200 drill core samples procured over an area of about 36 square miles in Polk County, Florida. Analyses were as follows:

| | Percent |
|---|---|
| $P_2O_5$ | 8.69 |
| $Al_2O_3$ | 8.68 |
| CaO | 6.37 |
| $U_3O_8$ | 0.014 |
| Acid insolubles | 68.72 |

Since the vast percentage of the acid insoluble material is quartz and since it has a coarser particle size than the other materials contained in the leached zone being mined, it has been found advantageous but not necessary to the invention to split the ore, after suitable comminution if desired, into one fraction of small particles and another fraction of coarser particles. It is not meant by this discussion to infer that the entire leached zone material would not be amenable to processing in accordance with the present invention. However, the solids are usually split at from about 150 mesh up to about 220 mesh after having been slurried with water. Other mesh splits may also be used commensurate with efficient operation of the comminution and classifying equipment. The fraction containing the particles smaller than this range has been found to be the more valuable fraction, while the fraction containing the particles larger than this range is the fraction which is predominantly quartz and, therefore, a discard material.

The process of the present invention preferably is concerned with the solubilizing and recovery of mineral values contained in the fraction whose particles are smaller than about —150 mesh. The following table shows a typical split in mineral values between the +200 mesh fraction and the —200 mesh fraction.

| Mineral Value | Plus 200 Mesh | Minus 200 Mesh |
|---|---|---|
| | Percent | Percent |
| $P_2O_5$ | 5.44 | 14.68 |
| $Al_2O_3$ | 1.68 | 25.34 |
| CaO | 5.53 | 9.19 |
| $Fe_2O_3$ | 1.60 | 3.11 |
| $U_3O_8$ | 0.0053 | 0.0299 |
| Acid Insolubles | 83.08 | 38.56 |

Leached zone material may be processed either on a so-called "as mined" basis or a "wet" basis. If the leached zone material is to be handled in wet form, the material is slurried to about 25% solids with water in a pit at the mining point, pumped to a plant, and subjected to a series of classification and thickening operations. From the classification step there is segregated a —200 mesh fraction which roughly will constitute between about 25% and about 35% of the original mined material. This —200 mesh fraction is subjected to thickening and filtering operations to reduce the moisture content. The solids are dried at a temperature of about 100° C. and are then ready for treatment in accordance with this process. If the mining method is a so-called dry mining method, the mined material is conveyed to a plant on belts and passed through a drying unit such as a rotary kiln where the solids emerge at about 100° C. The dry material is then subjected to classification operations such as an air classification operation to recover the —200 mesh fraction corresponding to that recovered in the wet classification system. In the wet classification system, the screened out +14 mesh size material is comminuted for liberation of constituents and the comminuted material subjected to sizing. The —200 mesh fraction is the preferable starting material for the subsequent processing of the instant invention.

Preferably the process of the instant invention comprises heat treating leached zone material, digesting the heat treated material with an aqueous solution of ammonium bisulfate, removing insoluble material from the digest solution, precipitating alum from the digest solution, removing precipitated alum from the mother liquor, removing uranium values from the mother liquor, and recovering the phosphate values from the resulting liquor solution. More in detail, the leached zone material is heat treated in the temperature range of between about 300° C. and about 1400° C., the temperature treatment being determined primarily by the degree of recovery sought as regards the minerals uranium, aluminum and phosphorus relatively or individually. If the highest possible recovery of all three minerals is sought simultaneously, then the heat treatment is preferably in the range of between about 400° C. and about 700° C. If, on the other hand, high recovery of phosphate is sought and recovery of aluminum and uranium is incidental, then heat treatment in the range of between about 850° C. and about 1000° C. is preferred.

When recovery of phosphate is to be sacrificed in favor of recovery of uranium and aluminum, then heat treatment in the range of between about 650° C. to about 800° C. is preferred. It will be seen from this discussion plus reference to the figure that for various mineral combinations there will be a preferred temperature range of heat treatment. This heat treatment may be carried out in kilns and the like. Heat treatment or calcination has a marked effect on the degree of dissolution of the minerals in the aqueous ammonium bisulfate solution and also a marked effect upon the filtration rate which has heretofore been one of the prime deterrents to chemical treatment of leached zone material.

Heat treatment to be effective must be for a minimum period of about 1 hour. Calcination at temperature for a period of from about 1 to about 4 hours is required to obtain dissolution of the various components in aqueous bisulfate leach solution within an economic digestion time. Preferably the leached zone material is calcined for a period of about 1 to about 2 hours.

Calcined leach zone material is cooled to a temperature below about 300° C. before leaching with aqueous solution. This may be accomplished by such means as blowing cold air through the material to speed it cooling or simply by storing the calcined product until heat has been dissipated and it is needed for processing.

Calcined material is digested with an aqueous solution of ammonium bisulfate. The calcined material is either slurried into a bisulfate solution of proper strength, or slurried with water after which ammonium bisulfate or ammonium bisulfate solution is added to the solids slurry. The acid dilution to some extent is dependent upon the physical characteristics of the resulting slurry, i. e., since it is preferred to stir or otherwise agitate the reaction mix, the slurry must be sufficently dilute to permit fluidity and the wetting of the solid particles, while at the same time attaining a homogeneous mixture.

In general, the amount of ammonium bisulfate added is correlated to a large extent to the other reaction conditions; namely, the temperatures at which the digesting and solubilizing takes place, the time of digestion, and the final total amount of bisulfate present in the slurry.

Depending upon the analyses of the particular leached zone processed, between about 55% and about 105% acidulation is desired. This corresponds to the addition of between about 65 pounds and about 137 pounds of ammonium bisulfate per 100 pounds of leached zone material processed. Between about 80% acidulation and about 95% acidulation is preferred, since in each instance the percent recovery of the valuable minerals in the leached zone material is at the optimum or approaching optimum conditions.

The percent acidulation referred to in this description is calculated on the basis of the reaction of acid sulfate with all of the iron, aluminum, calcium, or other significant cation constituents present in the leached zone material. In other words, 100% acidulation would be the addition of that amount of ammonium bisulfate required to completely react with these components. For practical operating considerations and from economic considerations the amount of acidulation generally varies from about 75% to about 90% or about 97.5 pounds to about 117 pounds of ammonium bisulfate per 100 pounds of leached zone material processed.

The time of digestion required normally will range between about 0.5 hour and about 6 hours, preferably between about 1 hour and about 2 hours. Such digestion times are for operating conditions of atmospheric pressure. If superatmospheric pressures are used the pressure employed will vary as well as the other reaction conditions depending upon any specific set of values maintained for reaction conditions. In general, the higher the superatmospheric pressure employed and the higher the temperature employed, the shorter the contact time required for digestion and dissolution of mineral values. Pressure digestion also tends to lower the quantity of bisulfate required to solubilize a given unit of constituent. On the other hand, there is no intention to infer that superatmospheric or autoclave pressures are necessary, and this process works entirely satisfactorily at atmospheric conditions. The temperature of digestion at atmospheric pressure conditions generally ranges from about 70° C. to about 100° C. For a digestion time of about 30 minutes a temperature in the range of 75° C. to 85° C. is generally preferred.

The digested material after treatment with ammonium bisulfate solution is filtered to remove the insoluble solids. At this stage of the processing, the slurry to be filtered generally has a specific gravity in the range of about 1.15 to about 1.35, with about 1.2 to about 1.3 preferred. At this specific gravity, filter rates vary directly with the heat treatment temperatures, i. e., the higher the calcination temperature, the higher the filtration rate, although it is not implied that this is a linear function. Leached zone calcined at a temperature of about 950° C. will have a filtration rate of about 12 to about 15 gallons of slurry per hour per square foot of filter area. This is comparable to a filter rate of about 1 to about 3 gallons of slurry per hour per square foot of filter area when the leached zone material is not calcined.

Filtration is carried out at temperatures as high as practical from an operational point of view. Generally, temperature of the slurry is maintained at between about 50° C. and about 95° C.

Hot clear liquor recovered by filtration is cooled to precipitate ammonium alum. Cooling to atmospheric temperature of about 20° C. to about 30° C. will crystallize out most of the ammonium alum. If more complete removal is desired, the solution may be cooled to temperatures in the range of about 0° C. to about 20° C. In general, substantially complete alum removal is accomplished more cheaply by adding additional ammonium sulfate to the liquor rather than resorting to refrigeration.

To produce a substantially aluminum-free liquor, there generally is added about one-third to about one half as much ammonium sulfate as was originally present in the digestion liquor, i. e., about 30 pounds to about 60 pounds of ammonium sulfate. Generally addition of ammonium sulfate is made to attain an $NH_4/Al_2(SO_4)_3$ mol ratio in the range between about 1.0:1 and about 4.5:1. Ammonium alum crystals are removed from the mother liquor by solid-liquid separation procedures.

Liquor substantially free of aluminum and suspended solids is subjected to uranium recovery by use of solvent extraction as the preferred modification. In solvent extraction the solution containing the uranium dissolved therein is preferably first subjected to a reduction reaction. This may be accomplished by electrolytic means or by chemical reaction wherein the solution is treated with metallic iron, aluminum, or certain free metals or other reducing agents capable of reducing the solution potential but not substantially introducing metallic ions detrimental to specifications of final products. This reduction reaction is believed to partially, if not completely, reduce the uranium from a hexavalent state to a quadrivalent state. If the addition agent is in powdered form, the slurry after several minutes is subjected to a liquid-solid separation to remove the unreacted and insoluble metal therefrom. This may be accomplished through the use of a filter, centrifuge, cyclone or other suitable separation device. Preferably, iron in the form of powder or filings is used as the reducing agent. Aluminum may be used and in this connection aluminum could be added prior to alum crystallization so that any dissolved aluminum could be recovered directly in the alum circuit and the reduced liquid then be subjected to solvent extraction procedure. Solvent extraction of the uranium may be employed after alum removal in an unreduced or only partially reduced state. The major difference between the reduced and unreduced solution is that the reduced solution will require less theoretical extraction stages than the unreduced. In reducing the uranium bearing solution between about 0.1 gram and about 8 grams of powdered iron, preferably about 2 grams, are added per liter of solution. The slurry is separated in a centrifuge and the reduced aqueous phase is then intimately contacted or otherwise agitated with the organic solvent phase.

This extraction or solvent phase is made up of two components, the extractant and the vehicle or extender. The extractant may be one or more of the ortho and/or pyrophosphoric acid esters of the alkyl monohydric alcohols. Both the mono- and di-esters as well as mixtures of the two are useful. The butyl, amyl, hexyl, heptyl, N- octyl, iso-octyl, decyl, etc., esters of phosphoric acid are satisfactory for the purpose. Phosphoric acid esters of octyl and higher molecular weight alcohols are preferred since they are less water soluble. It is to be understood, of course, that other extractants which are relatively immiscible with the aqueous phase and having uranium removal characteristics are likewise satisfactory. The extender or vehicle may be any one or more of the common organic solvents such as kerosene, benzene, naphtha, mineral spirits, carbon tetrachloride, trichlorethylene, toluene, xylenes, and the like. Extenders such as these are limited only in that they must be miscible or partially miscible with the extractant used and substantially immiscible with the aqueous phase. The concentration of the extractant in the extender or vehicle may vary widely, for example, between about 0.2% and about 95%, preferably between about 5% and about 10%. The volume ratios of aqueous phase to organic phase may vary within wide limits, for example, between about 1 to 1 and about 40 to 1, preferably between about 3 to 1 and about 10 to 1. It is preferred that the contact of the organic phase with aqueous phase be in such apparatus as a mixer extraction column and that the contact be at a temperature of between about room temperature (20° C.) and about 60° C. A continuous extraction carried out in multistage countercurrent extractors removes approximately 98% of the original values originally present in the aqueous phase to the organic phase. In a single stage of extraction utilizing the octyl ester of phosphoric acid, the ester being present in 10% solution in kerosene and the extraction being done at a 10 to 1 volume ratio of aqueous phase to organic phase, 95% of the uranium values present are transferred to the organic phase.

The organic phase is treated with aqueous hydrofluoric acid or any other mixture capable of precipitating and/or removing the $U_3O_8$ from the organic phase as a fluoride in about 5 molar excess over that required to produce $UF_4$. This precipitate together with its accompanying aqueous phase is separated from the organic phase and the solid $UF_4$ precipitate recovered by filtering centrifuging, or the like.

The aqueous phase after extraction of the uranium with organic solvent is treated to recover the predominantly phosphorus, nitrogen, and sulfur values which are in solution in any number of compounds such as ammonium sulfate, ammonium acid sulfates, minor amounts of miscellaneous metal sulfates and $P_2O_5$ values such as phosphoric acid or combined with the metal or cationic values as mentioned above. This aqueous solution may be adjusted in pH or neutralized with oxygen-containing basic alkaline earth metal compounds or with such reactants as ammonium hydroxide or ammonia gas or others which form substantially water soluble sulfates to give a precipitation of insoluble values, i. e., aluminum phosphate and iron phosphate. Stepwise precipitation of iron and aluminum phosphate would be accomplished by neutralizing the solution to a pH of about 3.5, separating the solids produced therein, and then further neutralizing the solution to a pH of about 7 to form a second precipitate. If the pH of the solution is adjusted with ammonium hydroxide, best separating conditions are obtained if the original solution is neutralized to a pH above about 9 and preferably to about 10.5. At this stage the slurry is fluid and filters or centrifuges with greater ease. Upon removal of the aluminum or iron precipitate formed under these conditions, the liquor resulting, depending upon the $P_2O_5$ and ammonia concentration, may be processed to recover ammonium phosphate values.

Instead of precipitating ammonium phosphate the liquor after uranium removal may be adjusted to a pH of between about 5.5 and about 7 with ammonium hydroxide, subjected to a solid liquid separation for removal of the precipitating values, and the resulting solution evaporating and crystallizing at about 80° C. This crystallization results in the formation of ammonium sulfate which can be removed by centrifuging. Following the recovery of ammonium sulfate, the resulting liquor may be cooled to a temperature of about 25° C. to about 30° C. to crystallize out an ammonium phosphate contaminated with ammonium sulfate. The ammonium sulfate and the ammonium phosphate-ammonium sulfate products may be purified by subsequent crystallization or drying for sale as produced.

Ammonium sulfate recovered as heretofore described may be recycled directly for thermal decomposition into ammonia and ammonium acid sulfate, both of which products can be reutilized in the process. Since ammonium sulfate is required in the primary alum crystallization, a portion of the ammonium sulfate is recycled directly with or without previous drying.

The invention will be further illustrated by the following examples.

EXAMPLE I

Dry leached zone material was air sized to produce a 500 pound fraction of material passing through a 200 mesh standard screen. The −200 mesh fraction was calcined in a rotary kiln at a temperature of about 815° C. for approximately one hour.

Calcined material was cooled to approximately 100° C. This calcined material was mixed with an aqueous solution consisting of 520 pounds of ammonium bisulfate and 1212 pounds of water corresponding to 80% acidulation. The slurry mixture was agitated for approximately 2 hours. The digested mixture was filtered and produced a filter cake weighing approximately 426 pounds dry weight. The filtrate plus filter wash water constituted approximately 2600 pounds of solution.

This filtrate solution was cooled to 25° C. Ammonium alum crystals precipitated at this temperature. The crystals recovered from the solution when dry weighed approximately 102 pounds. To this cool solution was added approximately 200 pounds of ammonium sulfate in 30% by weight solution form. This addition of ammonium sulfate crystallized out an additional 30 pounds of alum crystals $Al_2(SO_4)_3 \cdot (NH_4)_2SO_4 \cdot 24H_2O$. These crystals were removed from solution by filtration.

The solids free solution totaling approximately 290 gallons was subjected to contact with about 35 pounds of metallic iron filings and punchings in a packed tower. Contact time for the solution was about 10 minutes per unit of volume.

The reduced liquor was then contacted with organic solvent in the volume ratio of 4 volumes of liquor to one volume of a reaction product corresponding to a mixture of the mono- and di-esters of orthophosphoric acid and of iso-octyl alcohol. The intimate contact between the organic and aqueous phases was maintained for between 1 and 2 minutes in each of 4 successive contact stages. The organic solvent was then separated from the aqueous phase which was then processed to recover $P_2O_5$, nitrogen and other values.

The uranium-containing organic solvent was treated on a volume basis of 0.9 gallon of 50% aqueous hydrofluoric acid per one gallon of organic solvent. This mixture separated into an aqueous slurry phase and an organic solvent phase. The aqueous slurry was removed and the $UF_4$ precipitate recovered by filtration. Approximately 0.17 pound of dry $UF_4$ cake of about 60% uranium content is recovered per 100 gallons of aqueous solution extract.

The aqueous phase after solvent extraction was adjusted to a pH of about 7 with 29% ammonium hydroxide and evaporated to dryness to recover a product containing ammonia, sulfate and phosphate suitable for agricultural consumption.

Analytical results on various products of this process were as follows:

*Pounds of constituent indicated*

|  | $Al_2O_3$ | CaO | $P_2O_5$ | $Fe_2O_3$ | $SO_4$ | $U_3O_8$ | $NH_3$ |
|---|---|---|---|---|---|---|---|
| −200 Leached Zone (Feed) | 159.5 | 44.5 | 94.5 | 9.0 | 431.6 | 0.165 | 78.0 |
| Digestion Cake | 86.2 | 41.13 | 23.9 | 3.9 | 138.2 | 0.055 | 14.5 |
| Digestion Filtrate | 56.5 | 1.38 | 73.2 | 2.3 | 205.5 | 0.145 | 50.6 |
| Alum Crystals | 20.5 |  | 1.5 | 0.029 | 73.5 |  | 6.7 |

From the above data it is apparent that with calcining at 815° C. with 80% acidulation 48.3% of the aluminum is recovered and 88% of the uranium present in the leached zone is recoverable.

EXAMPLE II

Leached zone material was treated in all respects the same as in Example I, except that the calcining was at a temperature of 500° C. instead of 815° C.

*Pounds of constituent indicated*

|  | $Al_2O_3$ | CaO | $P_2O_5$ | $Fe_2O_3$ | $SO_4$ | $U_3O_8$ | $NH_3$ |
|---|---|---|---|---|---|---|---|
| −200 Leached Zone (Feed) | 66.4 | 8.8 | 32.2 | 1.84 | 164.47 | 0.054 | 29.11 |
| Digestion Filtrate | 16.98 | .04 | 27.7 | 1.3 | 62.50 | 0.034 | 15.52 |
| Alum Crystals | 10.5 |  | 0.52 | 0.026 | 39.60 |  | 3.7 |
| Alum Free Liquor | 16.02 |  | 21.6 |  |  | 0.033 |  |

EXAMPLE III

Leached zone material was treated in all respects the same as in Example I, except that the calcining was at a temperature of 760° C. instead of 815° C.

*Pounds of constituent indicated*

|  | $Al_2O_3$ | CaO | $P_2O_5$ | $Fe_2O_3$ | $SO_4$ | $U_3O_8$ | $NH_3$ |
|---|---|---|---|---|---|---|---|
| −200 Leached Zone (Feed) | 66.4 | 8.8 | 32.2 | 1.84 | 164.47 | 0.054 | 29.11 |
| Digestion Filtrate | 17.96 | 0.06 | 21.28 | 1.14 | 69.43 | 0.04 | 17.52 |
| Alum Crystals | 14.18 |  | 0.65 | 0.024 | 52.41 |  | 4.8 |
| Alum Free Liquor | 18.25 |  | 20.72 |  |  | 0.04 |  |

The figure is a plot of percent recovery of various minerals in the digestion filtrate versus calcining temperatures in degrees centigrade. The leached zone material was calcined at temperatures for 1 hour and the calcined material digested with ammonium bisulfate at 80% acidulation for two hours at a temperature of about 80° C.

Having thus fully described and illustrated the character of the invention, what is desired to be secured and claimed by Letters Patent is:

1. The method of recovering mineral values from leached zone material containing uranium and aluminum phosphate, from Florida phosphate pebble overburden, which comprises heat treating the leached zone material at a temperature in the range between about 300° C. and about 1100° C., digesting the heat treated material with aqueous ammonium bisulfate solution in quantity to give between about 55% and about 105% acidulation, separating insoluble material from the digest solution containing water soluble reaction products, and recovering at least one of the aluminum, uranium and phosphate values.

2. The method of recovering mineral values from leached zone material containing uranium and aluminum phosphate, from Florida phosphate pebble overburden, which comprises heat treating the leached zone material at a temperature in the range between about 400 and about 700° C., digesting the heat treated material with aqueous ammonium bisulfate solution in an amount to provide between about 55% and about 105% acidulation, whereby uranium values are solubilized and dissolved, separating insoluble material from the resulting aqueous slurry, and recovering uranium values from the aqueous phase.

3. The method of claim 2 wherein the heat treated material is digested with said aqueous solution of ammonium bisulfate at a temperature in the range between about 75° C. and about 85° C. for a period between about one-half hour and about two hours.

4. The method of claim 2 wherein said leached zone material is the −200 mesh fraction obtained by size separation of leached zone ore.

5. The method of recovering mineral values from leached zone material containing uranium and aluminum phosphate from Florida phosphate pebble overburden, which comprises heat treating the leached zone material at a temperature in the range between about 400 and about 700° C., digesting the heat treated material with aqueous ammonium bisulfate solution in an amount to provide between about 55% and about 105% acidulation, whereby uranium, phosphorus and aluminum values are solubilized and dissolved, separating insoluble material from the resultant aqueous slurry, and recovering uranium, phosphorus and aluminum values from the aqueous phase.

References Cited in the file of this patent

UNITED STATES PATENTS

| 1,015,499 | Langlet et al. | Jan. 23, 1912 |
| 1,948,888 | Sanders | Feb. 27, 1934 |
| 2,227,833 | Hixson et al. | Jan. 7, 1941 |
| 2,405,426 | Hitchon et al. | Aug. 6, 1946 |
| 2,767,046 | Piros | Oct. 16, 1956 |

FOREIGN PATENTS

| 503,098 | Canada | May 25, 1954 |

OTHER REFERENCES

Warf: U. S. Atomic Energy Comm., declass. paper No. AECD-2524 (Aug. 7, 1947), 10 pages.

Engineering and Mining Journal, vol. 155, No. 10, page 122 (October 1954).